US009851786B2

(12) United States Patent
Pedrotti et al.

(10) Patent No.: US 9,851,786 B2
(45) Date of Patent: Dec. 26, 2017

(54) SYSTEM AND METHOD FOR ASSISTING A USER IN REMAINING IN A SELECTED AREA WHILE THE USER IS IN A VIRTUAL REALITY ENVIRONMENT

(71) Applicant: Sixense Entertainment, Inc., Los Gatos, CA (US)

(72) Inventors: Owen Walter Pedrotti, Daly City, CA (US); Alejandro Santiago Diaz, Ross, CA (US); Steven L. Braman, San Francisco, CA (US); Danny G. Woodall, Kirkland, WA (US); Amir Rubin, Los Gatos, CA (US)

(73) Assignee: Sixense Entertainment, Inc., Los Gatos, CA (US)

( * ) Notice: Subject to any disclaimer, the term of this patent is extended or adjusted under 35 U.S.C. 154(b) by 116 days.

(21) Appl. No.: 14/793,731

(22) Filed: Jul. 7, 2015

(65) Prior Publication Data

US 2016/0171771 A1  Jun. 16, 2016

Related U.S. Application Data

(60) Provisional application No. 62/090,314, filed on Dec. 10, 2014.

(51) Int. Cl.
*G06F 3/01* (2006.01)
*G02B 27/01* (2006.01)
*G06F 3/00* (2006.01)

(52) U.S. Cl.
CPC ........... *G06F 3/012* (2013.01); *G02B 27/017* (2013.01); *G06F 3/002* (2013.01); *G06F 3/011* (2013.01);

(Continued)

(58) Field of Classification Search
None
See application file for complete search history.

(56) References Cited

U.S. PATENT DOCUMENTS 6,714,213 B1    3/2004   Lithicum et al.
2005/0123171 A1*   6/2005   Kobayashi .............. G06F 3/011
                                                                                                                         382/103

(Continued)

OTHER PUBLICATIONS

Gabriel Cirio, Peter Vangorp, Emmanuelle Chapoulie, Maud Marchal, Anatole Lecuyer, George Drettakis, Walking in a Cube: Novel Metaphors for Safely Navigating Large Virtual Environments in Restricted Real Workspaces, 2012, IEEE Transactions on Visualization and Computer Graphics, Institute of Electrical and Electronics Engineers, 18(4):546-554.*

(Continued)

*Primary Examiner* — Michael J Cobb
(74) *Attorney, Agent, or Firm* — Gard & Kaslow LLP

(57) ABSTRACT

A method and apparatus is disclosed for assisting a user, wearing a head mounted display (HMD) that covers a user's field of vision and has a tracker providing information regarding the position and orientation of the HMD, in locating a physical controller located on a physical base station. A processor causes the HMD to display a virtual world, including a virtual representation of the physical base station and physical controller along with a virtual hand that helps guide the user to the physical base station to allow the user to pick up the physical controller. Another embodiment allows an area in the physical world to be defined within which the user should remain, for example to avoid physical obstacles. The processor causes the HMD to display a warning, such as a virtual fence, to alert the user if the user approaches to within a preselected distance of the boundary.

19 Claims, 15 Drawing Sheets

(52) U.S. Cl.
CPC ........ *G06F 3/014* (2013.01); *G06F 2203/012* (2013.01)

(56) References Cited

U.S. PATENT DOCUMENTS

| | | | | |
|---|---|---|---|---|
| 2006/0227151 | A1* | 10/2006 | Bannai | A63F 13/00 345/633 |
| 2006/0273984 | A1* | 12/2006 | Wanda | G06F 3/011 345/7 |
| 2009/0187389 | A1* | 7/2009 | Dobbins | G06F 3/011 703/6 |
| 2012/0092328 | A1 | 4/2012 | Flaks et al. | |
| 2013/0084970 | A1 | 4/2013 | Geisner et al. | |
| 2013/0253832 | A1* | 9/2013 | Nallu | G06Q 30/0633 701/537 |
| 2013/0265232 | A1* | 10/2013 | Yun | G09G 3/3208 345/158 |
| 2013/0286004 | A1 | 10/2013 | McCulloch et al. | |
| 2014/0364209 | A1* | 12/2014 | Perry | G06F 3/013 463/31 |
| 2016/0124502 | A1 | 5/2016 | Sawyer et al. | |

OTHER PUBLICATIONS

Jack Goldfeather, Victoria Interrante, Adaptive Redirected Walking in a Virtual World, 2012, IEEE VR Workshop on Perceptual Illusions in Virtual Environments, pp. 1-4, DOI: 10.1109/PIVE.2012.6229795.*

Frank Steinicke, Gerd Bruder, Klaus Hinrichs, Jason Jerald, Harald Frenz, Markus Lappe, Real Walking through Virtual Environments by Redirection Techniques, 2009, Journal of Virtual Reality and Broadcasting, 6(2):1-16.*

Technical Overview IS-900 Motion Tracking System by InterSense, Inc of Bedford, MA 01730, 1999, pp. 1-10.*

* cited by examiner

SYSTEM AND METHOD FOR ASSISTING A USER IN REMAINING IN A SELECTED AREA WHILE THE USER IS IN A VIRTUAL REALITY ENVIRONMENT

FIELD OF THE INVENTION

The present invention relates generally to virtual reality devices, and more particularly to controllers for use in a virtual reality context.

BACKGROUND OF THE INVENTION

Virtual reality is often used to describe a wide variety of applications commonly associated with immersive, highly visual, computer-simulated environments that can simulate a user's physical presence in places in the real world or imagined worlds. While virtual reality can recreate a number of sensory experiences, the senses most commonly used today to create virtual reality appear to be sight and sound.

One method of presenting a virtual world to a user that is commonly identified with virtual reality and presently in use is through the use of a visor or helmet containing a video display which encompasses part or all of a user's field of view and presents computer generated images representing the virtual reality environment, or "virtual world," to the user. Such a device is often referred to as a head-mounted display, or HMD. One type of HMD presently available is the Oculus Rift from Oculus VR, now owned by Facebook.

Typically a HMD covers the user's eyes, so that the user sees only the virtual world while wearing the HMD and is thus unable to see the actual physical world around the user while in the virtual world. For this reason, the use of a HMD can create some issues when it is necessary or desirable that the user interact with, or sometimes not interact with, the real world. Since the user cannot see the real environment, the user may not know what actions by the user should occur in the real world, and what actions may have detrimental consequences in the real world.

One instance of such an issue may arise when the user wishes to be able to use some type of input device while in the virtual world. For example, a user may wish to use a handheld controller, such as might be used to play a video game, while in a virtual world, and perhaps even two controllers, one for each hand. However, since the user cannot see the physical world once he or she is wearing the HMD, it can be difficult for the user to locate and pick up the controller after putting on the HMD, as the user must blindly fumble around the physical environment to locate the controller(s).

Alternatively, it can be difficult to pick up and put on a HMD if the user has already picked up and is holding a controller in his or her hand, and even more so if there are two controllers. In this case, the user may drop one or more of the controller(s) or HMD, resulting in possible damage to the devices.

Another issue with respect to the user's interactions with the physical world is that it is difficult for the user to maintain awareness of his or her location in the physical world while the user sees only the virtual world. It may be desirable that the user remain within a selected area, for example, if there are physical objects in the vicinity of the user. The user may wish to be able to move within the virtual world by, for example, taking a step or moving an arm; of course, any such movement also results in the user moving in the physical world. When playing a conventional video game on a television, for example, even when using a controller which responds to the user's motion the user is able to see nearby objects, and avoid moving the controller in a way which causes the user to collide with such objects. However, when using a HMD the user is unable to see those nearby objects while in the virtual world, and may thus not be aware of impending collisions.

It is thus desirable to find a solution that will allow a user in a virtual world presented by a HMD to be aware of the user's physical surroundings to a sufficient degree to allow the user to pick up handheld controllers, and to remain in a selected area, for example to avoid collisions with surrounding physical objects.

SUMMARY OF THE INVENTION

A system and method is disclosed which provides visual assistance to a user in a virtual reality environment in locating physical objects which the user is unable to see, specifically a physical controller that a user may use to control certain actions or events in the virtual world and which is located on a physical base station. Another system and method is disclosed which provides visual assistance to a user in a virtual reality environment in remaining within a selected area, for example to avoid physical objects in the user's vicinity which the user is unable to see while in the virtual world.

One embodiment discloses a method of assisting a user wearing a head-mounted display (HMD) in remaining within a selected area of the physical world, the user holding a handheld controller having a controller tracker which provides information regarding a position of the handheld controller, the method comprising: receiving, by a processor as an input, a definition of a boundary of the selected area; determining, by the processor, the position of the handheld controller in the physical world using information from the controller tracker; generating and outputting, by the processor, instructions to the HMD to display on the HMD a virtual world; determining, by the processor, from the position of the handheld controller that the handheld controller is within a first preselected distance from the boundary; generating and outputting, by the processor, instructions to the HMD to display on the HMD a first visual warning in the virtual world.

Another embodiment discloses a system to assist a user in remaining in a selected area of the physical world, the user wearing a head-mounted display (HMD) and holding a handheld controller, comprising: a controller tracker on the handheld controller which provides information regarding a position of the handheld controller; and a processor configured to: receive as an input a definition of a boundary of the selected area; determine the position of the handheld controller in the physical world using information from the controller tracker; generate and output instructions to the HMD to display on the HMD a virtual world; determine from the position of the handheld controller that the handheld controller is within a first preselected distance from the boundary; and generate and output instructions to the HMD to display on the HMD a first visual warning in the virtual world.

Still another embodiment discloses a non-transitory computer-readable medium having embodied thereon a program, the program being executable by a processor to perform a method of assisting a user wearing a head-mounted display (HMD) in remaining within a selected area of the physical world, the user holding a handheld controller having a controller tracker which provides information regarding a position and orientation of the controller, the method comprising the steps of: receiving, by a processor as an input, a definition of a boundary of the selected area; determining, by the processor, the position of the handheld controller in the physical world using information from the controller tracker; generating and outputting, by the processor, instructions to the HMD to display on the HMD a virtual world; determining, by the processor, from the position of the handheld controller that the handheld controller is within a first preselected distance from the boundary; generating and outputting, by the processor, instructions to the HMD to display on the HMD a first visual warning in the virtual world.

DETAILED DESCRIPTION OF THE INVENTION

A method and apparatus is disclosed for assisting a user in locating physical objects while the user is wearing a head mounted display (HMD) that covers a user's field of vision and has a tracker allows a processor to track the position and orientation of the HMD, the objects being specifically one or more physical controllers that a user may use to control certain actions or events in the virtual world and which are located on a physical base station. Another described method and apparatus assists such a user in avoiding physical obstacles in the user's vicinity. Since the user wearing the HMD sees only a virtual world, the user is unable to see such physical objects or obstacles.

In one embodiment, when a user activates a display of a virtual world into which the user wishes to enter, for example, through the display of a HMD, a processor tracks the position and orientation of a tracker on the HMD. The processor also instructs that display to include in the display of the virtual world a virtual representation of the physical base station and the physical controller, along with a virtual hand that helps guide the user to the physical base station so as to allow the user to pick up the physical controller. Once the physical controller has been picked up and the user has moved a certain distance from the physical base station, a virtual hand may be shown without the virtual controller to heighten the sense of realism in the virtual world. This allows the user to locate and pick up the physical controller (s) by the sight provided in the virtual world, rather than having to feel around to locate the controller(s) by touch.

In another embodiment, a boundary of a selected area is determined, for example, a "safe area" which the user or another person has determined is clear of physical obstacles in the physical world so that the user may move freely without coming into contact with such physical obstacles. The processor similarly tracks the position and orientation of the HMD tracker, and possibly the position and orientation of one or more trackers in the physical controllers, and generates instructions to the HMD to include in a display of a virtual world a visual warning such as a grid or virtual fence when the user comes within a preselected distance of the boundary, thus providing a warning that the user is about to move out of the selected area.

Figure 1:
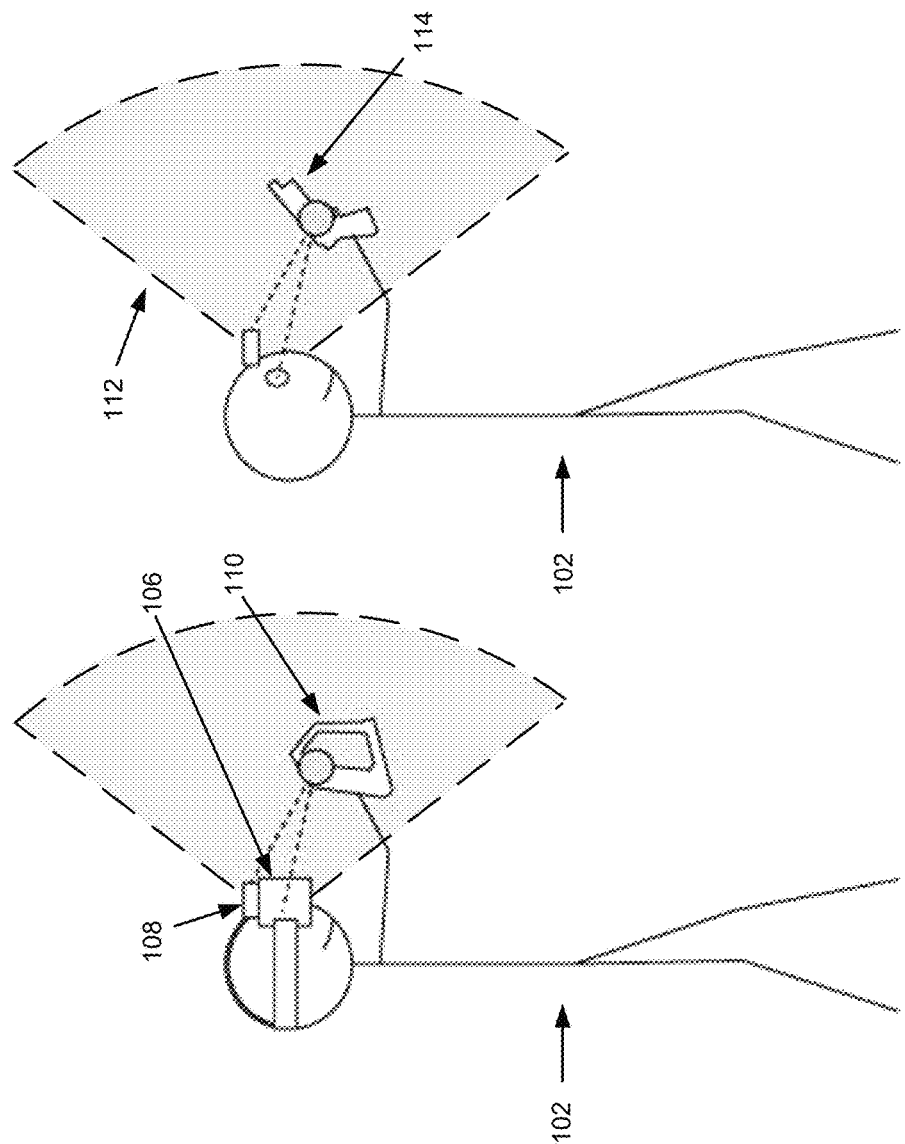
FIGS. 1A and 1B are illustrations of a user wearing a head mounted display (HMD).

FIG. 1A shows a user 102 in the real world wearing a HMD 106; HMD 106 covers the user's eyes and presents the user with a representation of a virtual world, while preventing the user from seeing the real, or physical, world.

Attached to or incorporated in the HMD 106 is a tracker 108, which can be used to determine the position and orientation of the headset 104, and thus of the head of user 102, by, for example, sensing an electromagnetic field generated from a local base station, video game console or other apparatus (not shown). The tracker 108 provides information about the sensed magnetic field to a processor (also not shown), which derives the position and orientation of the tracker 108, and thus HMD 106, relative to a source of the electromagnetic field from such information.

Such trackers, and the processors which determine the position and orientation of such trackers, are well known to those of skill in the art. One such example, U.S. Pat. No. 4,737,794, teaches a "method and apparatus for determining remote object orientation and position with an electromagnetic coupling." It shows a plurality of radiating antennas located at a source to provide a plurality of electromagnetic fields spanning three dimensional space and defining a source reference coordinate frame, and a plurality of receiving antennas located on an object to be tracked for receiving that field. A processor receives the outputs from the receiving antennas and converts the received components of the transmitted electromagnetic fields into remote object position and orientation relative to the source reference coordinate frame. The antennas may be, for example, dipole antennas, loop antennas, or coil antennas.

Another such example are light-emitting trackers which can be seen by, and therefore provide position and orientation information to, a camera mounted on the base station or elsewhere. Other forms of trackers, including those incorporating inertial sensors (e.g., accelerometers and/or gyroscopes), can likewise be used in the present approach. As would be understood by one of ordinary skill in the art in light of the teachings herein, essentially any type of tracker (e.g., magnetic, optical, electrical, sonar, radar, ultrasonic, or any combination thereof) which can provide information regarding its position (and, in some cases, orientation, if needed or desired) can be used in the present approach. Such techniques are all contemplated as being within the described system and method, including techniques which can only provide position information, and not orientation, even though the below discussion generally refers to electromagnetic tracking.

FIG. 1A also shows the user 102 holding a controller 110 which the user may pick up with his or her hand(s), and which allows the user to perform various functions in the virtual world. Various devices suitable for use as controller 110 will also be known to those of skill in the art. In addition to tracker 108 in HMD 106, handheld controller 110 may also have a tracker, from which a processor can derive the position and orientation of handheld controller 110 relative to the base station, by any of the tracking techniques described above. Techniques for identifying multiple trackers and distinguishing the position and orientation of each are well known to those of skill in the art.

FIG. 1B is a representation of the user 102 of FIG. 1A as the user 102 sees the virtual world, showing the field of view 112 that may be presented to the user by the HMD 106. As will be known to those of skill in the art, a processor (not shown) generates instructions that cause HMD 106 to present a view to user 102 that is appropriate given the position and orientation of user 102's head and any actions taken with controller 110, so that what is within field of view 112 will change as user 102 moves his or her head and uses controller 110.

In the illustration of FIG. 1B, the user is seeing the virtual world as presented on HMD 106. In FIG. 1B the user also sees a virtual object 114 in his or her hand, here a virtual gun, rather than the controller 110 that the user is actually holding as in FIG. 1A. As will be explained below, the user has presumably used the controller to interact with the virtual world to "pick up" the virtual gun 114.

In some embodiments, the controller 110 may be placed or "docked" in a base station or video game console (not shown). In some embodiments, the base station or console may contain the processor as well as the other components needed to determine the position and orientation of the trackers in the HMD and controllers. For example, the base station may contain the electromagnetic field source for electromagnetic trackers, a camera for optical detection of certain types of trackers, or other elements needed to determine the position and orientation of other types of trackers.

In other embodiments, the base station may be only a cradle or dock upon which the controller may rest, perhaps with a groove or contour that conforms to the shape of the controller, with the processor and/or other components located elsewhere. Alternatively, some components may be in the base station and some components located elsewhere. If components such as the electromagnetic field source or camera used to determine the position of the HMD and controller trackers relative to the base station are not located in the base station, it will be desirable for the base station to also contain a tracker similar to those used in the HMD and controllers, so that the position of the base station is known and thus the positions of the HMD and controllers relative to the base station can be determined.

In the description herein, it is assumed that the position of the HMD and controller trackers relative to the base station may be determined by any of the tracking means described above, regardless of whether the processor and other components needed for determining those relative positions are located in the base station or elsewhere.

In one embodiment, controller 110 contains a rechargeable battery, and circuitry in the base station may charge the battery when the controller is located in the base station. In other embodiments, there may be two controllers 110, where it is intended that there is one controller 110 for each hand of user 102.

As above, with a HMD 106 which covers the eyes of user 102, once user 102 has donned the HMD 106, user 102 can no longer see the surrounding physical world, including the controller 110 or a physical base station in which the controller 110 may be placed. User 102 is thus unable to determine where the controllers are in the physical world in order to pick them up other than perhaps by blindly feeling around the area in which the user believes the base station might be located.

For this reason, rather than forcing the user to locate the controller by touch, one embodiment provides a visual representation in the virtual world of a virtual base station and virtual controller so that the user may find and pick up the virtual controller by sight in the virtual world, thus picking up the physical controller without being able to see the actual physical controller due to the HMD 106 presenting the user with only a representation of the virtual world.

Figure 2:
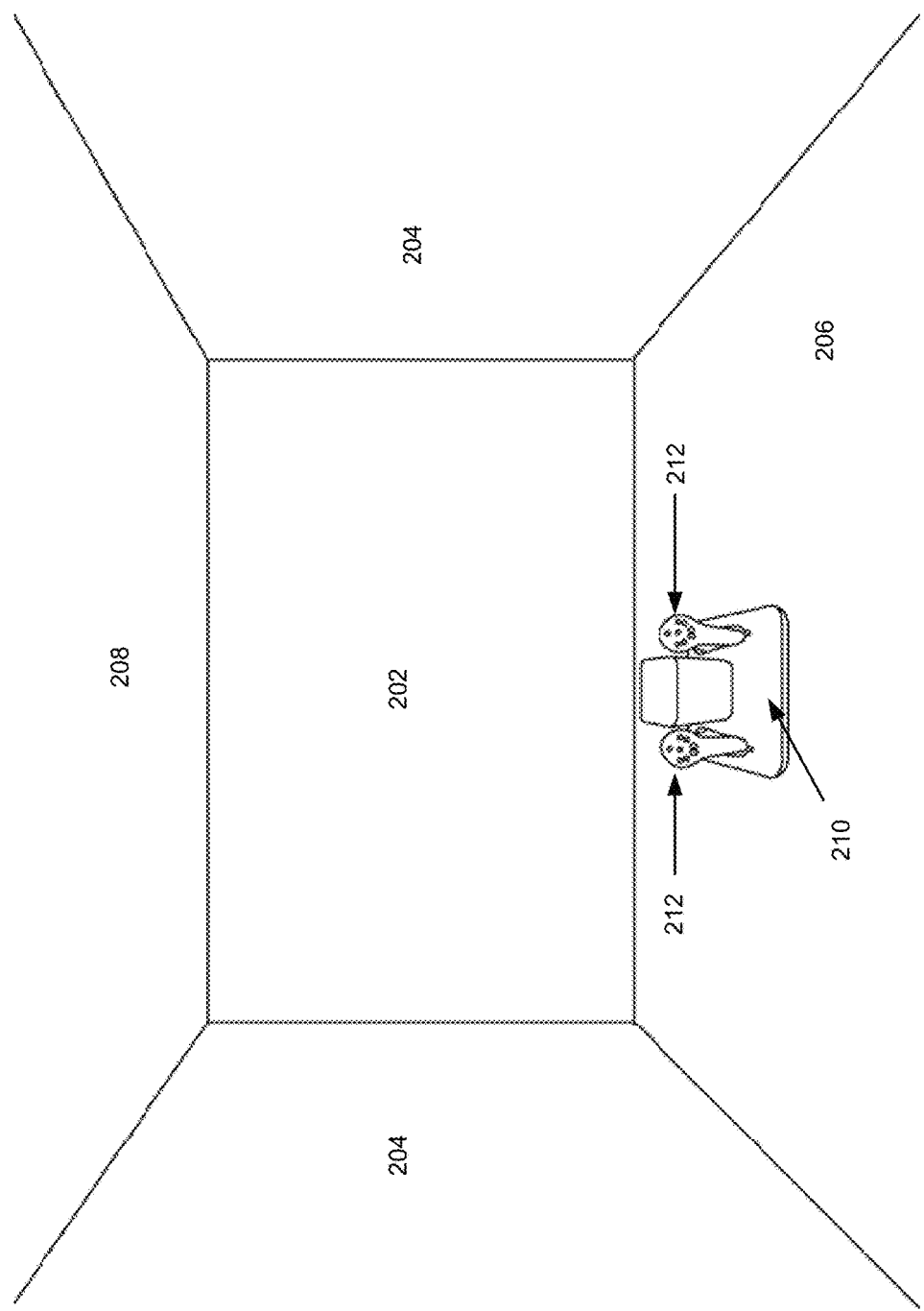
FIG. 2 is an illustration of a generated virtual world including a virtual base station and virtual controllers as it might be seen by a user wearing a HMD.

FIG. 2 shows what a user such as user 102 might see in the virtual world displayed in the HMD 106 in one embodiment. In the illustrated embodiment, the processor has generated instructions to the display of HMD 106 to create a picture of a virtual world as if the user is looking toward a back wall 202, and also displays side walls 204, floor 206 and ceiling 208. Also displayed is a virtual base station 210, in which are docked two virtual controllers 212.

In one embodiment, the processor causes the HMD 106 to display virtual base station 210 and virtual controllers 212 as having the same general appearance as the actual physical base station and the physical controllers that the user will pick up and use to control interactions with the virtual world, and to appear to the user in an apparent location in the virtual world which corresponds to the actual location of the physical base station and controllers in the real world. Thus, although the user is only seeing the virtual world, if the user approaches the virtual base station 210, he or she will also be approaching the physical base station in the real world.

As above, in some embodiments a user such as user 102 wears a HMD 106 which has attached to it a tracker 108 which can track the position and orientation of the headset 104, and thus the head of user 102 by any of the tracking techniques above, such as with respect to an electromagnetic field generated by a source located in the physical base station or elsewhere. (Again, the base station should also have a tracker if such components as the electromagnetic source or camera used to track the HMD are not located in the base station.) Thus, as the user approaches the virtual base station 210 presented on the display, the processor receiving information from tracker 108 (and from the base station tracker where appropriate) can determine that the user is also approaching the physical base station.

Figure 3:
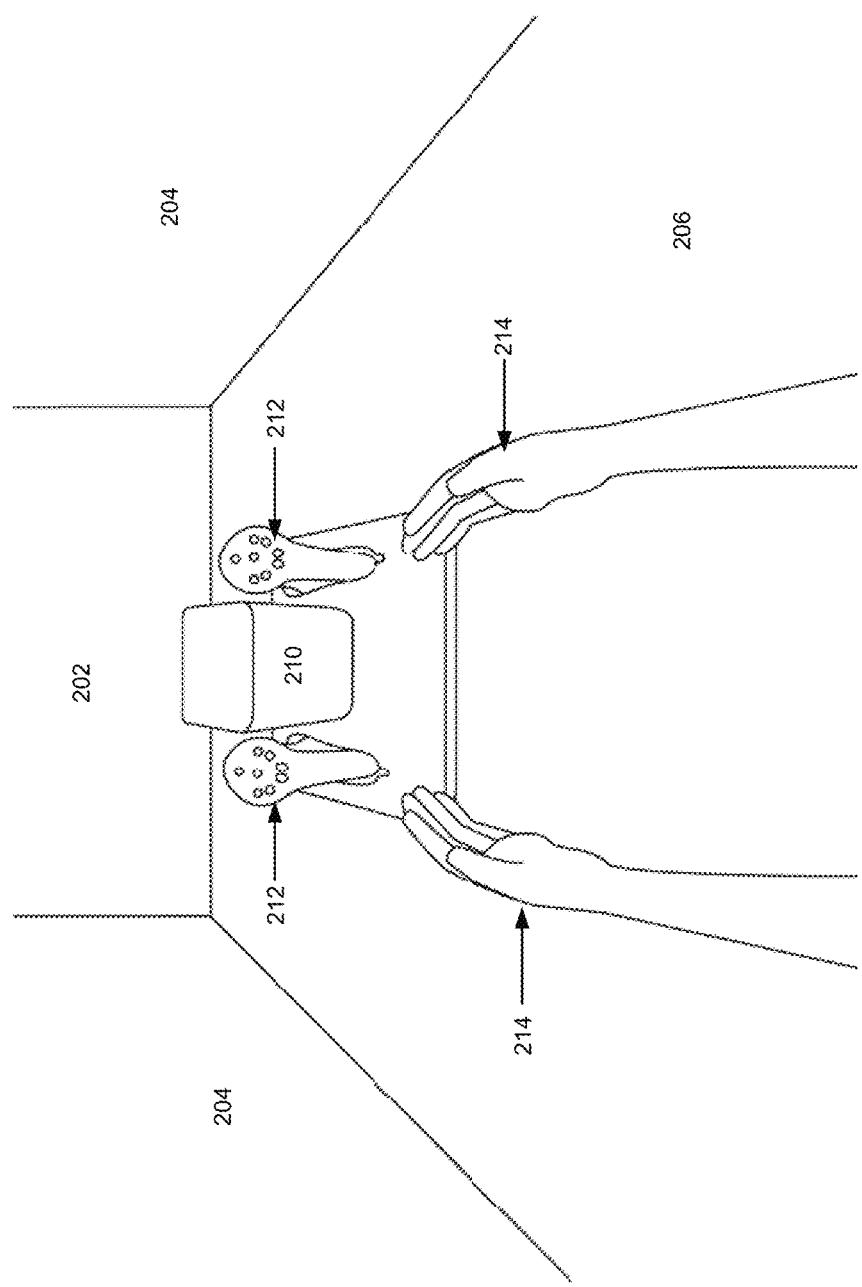
FIG. 3 is an illustration of a generated virtual world including a virtual base station, virtual controllers and virtual hands as it might be seen by a user wearing a HMD.

FIG. 3 shows what a user might see in the virtual world in one embodiment as the user has approached the virtual base station 210 in the virtual world and is looking down towards it, and is also approaching the physical base station in the real world. Now the processor has generated instructions to alter the display to the user so that the perspective has changed, and it appears as if the user is closer to the virtual base station 210 and looking down towards it. The back wall 202, side walls 204 and floor 206 are still displayed.

In addition, the instructions from the processor now also cause the display to generate two virtual hands 214 (with a portion of the forearms) reaching toward the virtual base station 210. At this point, since the processor has no information about where the user's hands are in the physical world, the location of these virtual hands 214 is assumed from the position and orientation of the user's head as determined from the tracker, and are intended to provide guidance and assistance to the user in locating the physical base station and physical controllers in the physical world.

Figure 4:
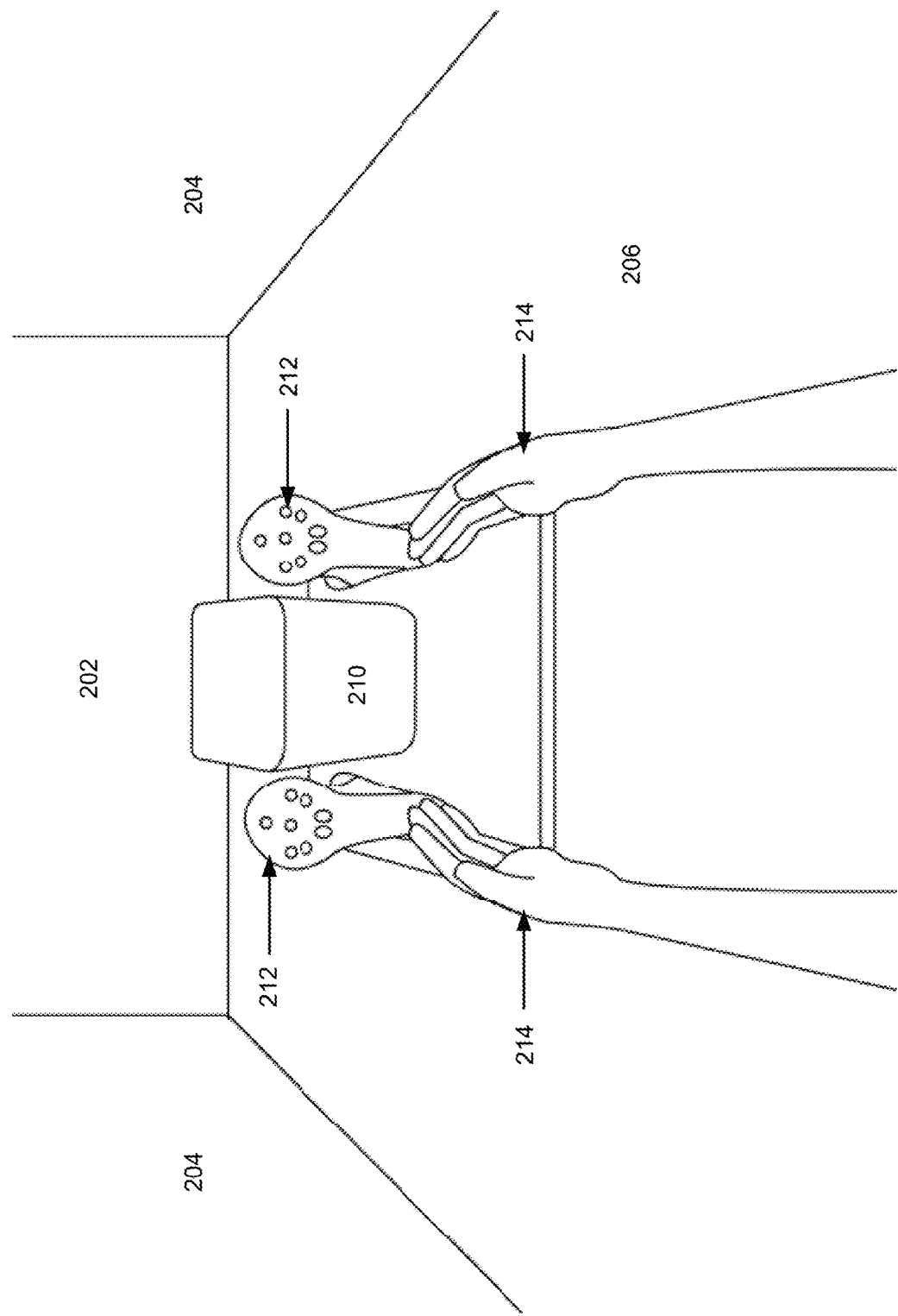
FIG. 4 is another illustration of a generated virtual world including a virtual base station, virtual controllers and virtual hands as it might be seen by a user wearing a HMD as the user approaches a physical base station.

As the user gets still closer to the physical base station and physical controllers in the physical world, again as determined from the position of the tracker of the HMD on the user's head, in one embodiment the processor will generate instructions to alter the display as shown in FIG. 4. Now the user appears to be closer to the virtual base station 210, and the virtual hands 214 appear to be closer to the virtual base station 210, than in FIG. 3, although again at this point the location of virtual hands 214 is assumed from information provided by the tracker on the HMD on the user's head. Again, the virtual base station 210 and virtual hands 214 assist the user in locating the physical base station and physical controllers.

Figure 5:
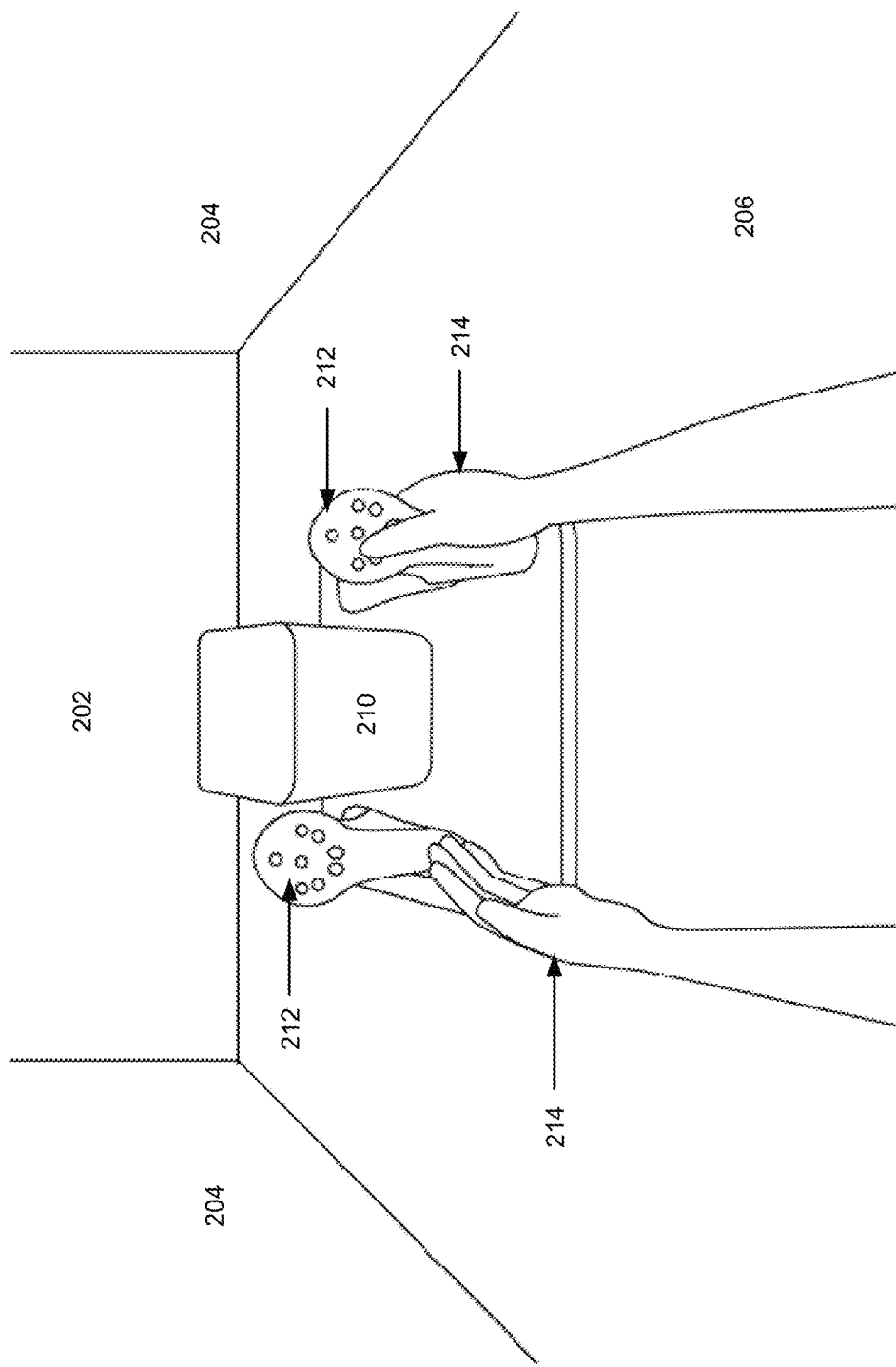
FIG. 5 is another illustration of a generated virtual world including a virtual base station, virtual controllers and virtual hands as it might be seen by a user wearing a HMD after the user has removed a physical controller from the physical base station.

FIG. 5 shows what the user might see in the displayed virtual world in one embodiment after grasping one of the physical controllers and removing it from the physical base station. The processor now generates instructions to display the virtual world much as it appears in FIG. 4, with the back wall 202, side walls 204, floor 206, and virtual base station 210 displayed. However, as will be explained below, now the processor is able to determine that the user has removed the right physical controller from the physical base station in the physical world, and now displays the virtual right hand 214 as holding the right virtual controller 212 instead of the right virtual controller 212 being docked in the virtual base station as in FIG. 4.

As above, the physical controllers may also have magnetic trackers located within them, similar to the tracker in the headset. If so, the processor is now able to determine from information received from the tracker in the right physical controller where the user's hand holding that controller is located. The processor may then display the virtual right hand 214 in a location within the virtual world that appears to the user to be where the physical right hand is actually located, rather than providing only an estimated location as before.

In one embodiment, the processor is able to detect that the electrical connection between the right physical controller and the physical base station has been broken, and thus determine that the right physical controller has been removed from the physical base station. In another embodiment, by using information from the tracker in the right physical controller to determine the position of the right physical controller relative to the physical base station, the processor is able to determine that the right physical controller is no longer in the location in which it is docked in the physical base station.

At the point in time shown in FIG. 5, since the left physical controller has not been removed from the physical base station, the instructions from the processor cause the left virtual controller 212 to still be displayed as docked in the virtual base station 210. Similarly, virtual hand 214 is still shown in an estimated location, since the processor still has no information about where the user's physical left hand is actually located.

Figure 6:
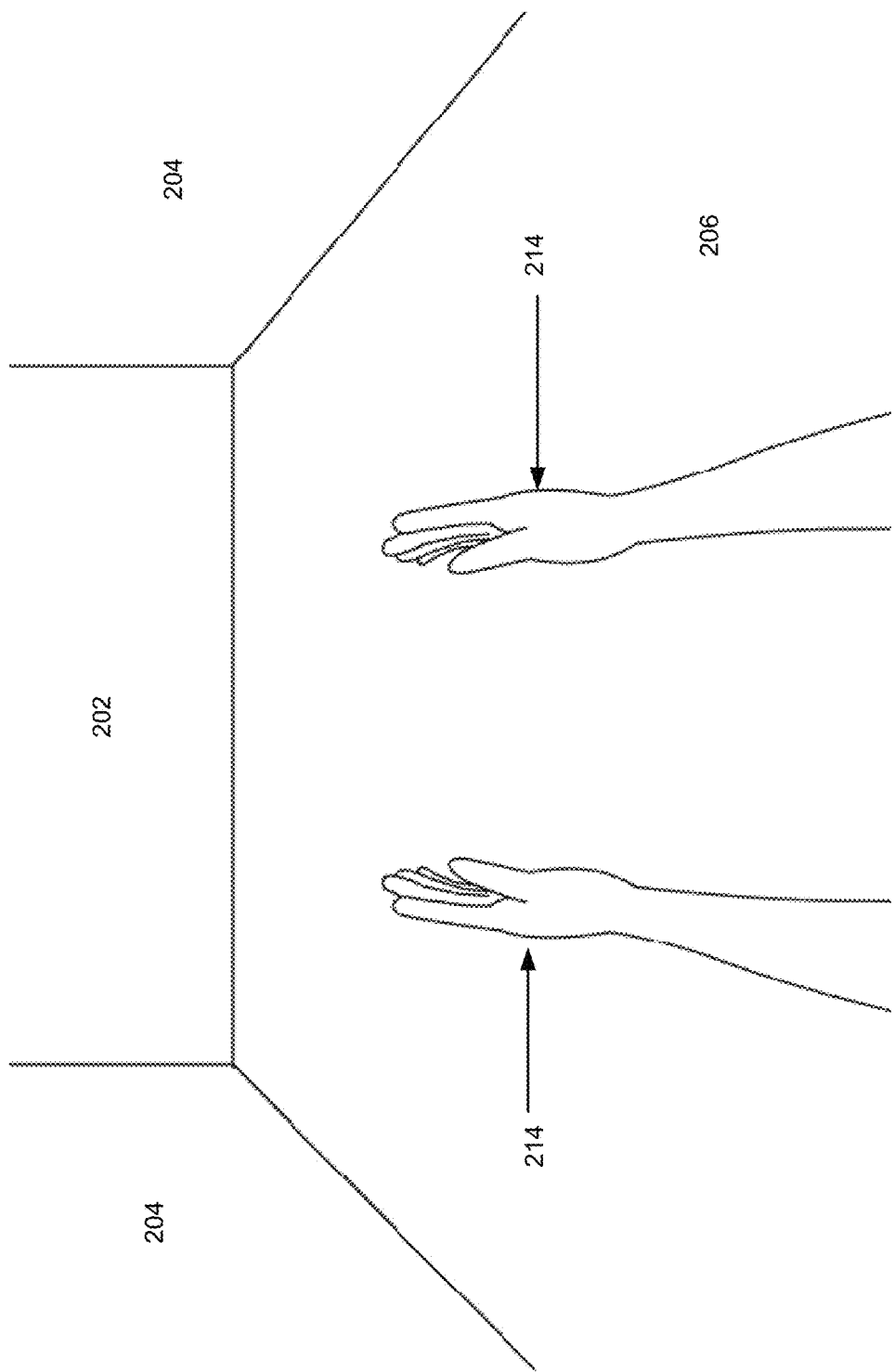
FIG. 6 is another illustration of a generated virtual world including virtual hands as it might be seen by a user wearing a HMD after the user has removed both physical controllers from the physical base station.

Once both controllers have been picked up, to enhance the realism of the virtual world, it is desirable that the user no longer see the virtual base station 210 or the virtual controllers 212, i.e., that the instructions from the processor no longer cause the HMD to show them. As discussed below with respect to FIG. 8, this can, for example, allow the processor to cause the HMD to display the user's virtual hands doing something in the virtual world, such as grasping a virtual object, rather than holding the virtual controllers (even though the user will of course continue to feel the physical controllers in his or her hands). FIG. 6 shows one embodiment of what might be displayed to a user in a displayed virtual world once both physical controllers have been picked up by the user. Instructions from the processor again cause the display of the virtual world to appear much the same as it appears in FIG. 4 or 5, with the back wall 202, side walls 204, and floor 206 displayed. However, now the processor has determined that the user has removed both physical controllers from the physical base station, it now displays both virtual hands 214 without either the virtual controllers 212 or the virtual base station 210 being displayed.

Since the processor is now able to determine from information received from the controller trackers in the physical controllers where the user's hands holding the controllers are located, the processor may then display both virtual hands 214 in apparent locations within the virtual world that correspond to where the user's physical hands are actually located, rather than providing only an estimated location for either or both virtual hands 214 as before.

Figure 7:
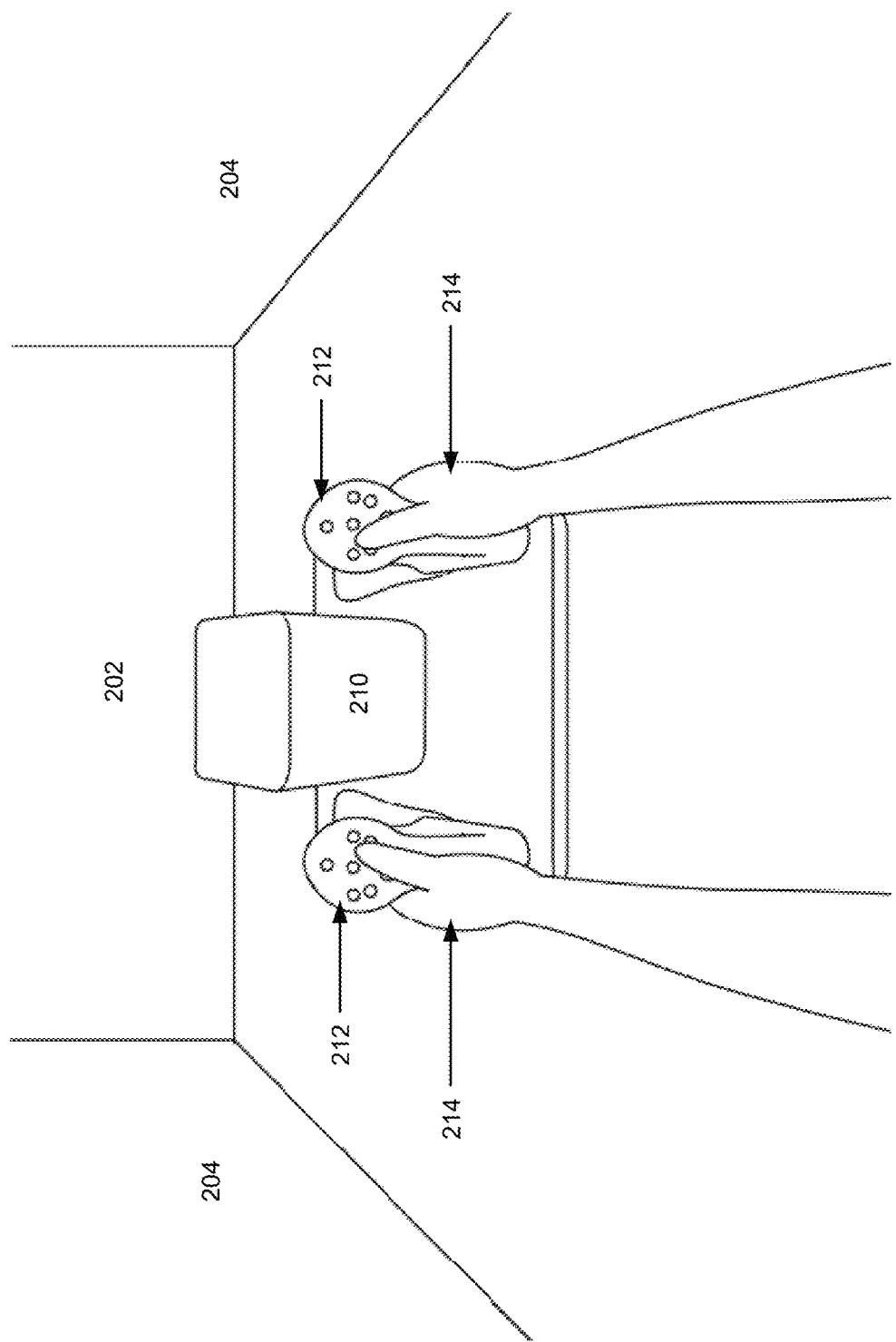
FIG. 7 is another illustration of a generated virtual world including a virtual base station, virtual controllers and virtual hands as it might be seen by a user wearing a HMD after instructing the processor to display the virtual base station and virtual controllers.

At some point, the user may wish to return the physical controllers to the physical base station. In one embodiment, the user may cause the processor to display both the virtual base station 210 and the virtual controllers 212, by, for example, entering an appropriate command on a controller, so that the user may see their locations in the virtual world. FIG. 7 shows what a user might see once such a point is reached. The instructions from the processor to the HMD again cause the virtual world to appear much the same as it appears in the previous FIGS. 4 to 6, with the back wall 202, side walls 204, and floor 206 displayed. Now, however, the virtual base station 210 and virtual controllers 212 are again displayed, with the user's two virtual hands 214 holding the virtual controllers 212, as a user might see his or her hands in the real world.

As with the virtual hands 214 in FIG. 6, the virtual hands 214 of FIG. 7 are shown in apparent locations in the virtual world that correspond to the actual locations of the user's physical hands in the physical world. Since the processor still has information from the trackers in the physical controllers being held in the user's hands, the actual location of the user's hands can still be determined and therefore the virtual hands can be shown by the HMD in such corresponding apparent locations. Since the virtual base station is also in an apparent location in the virtual world that corresponds to the location of the physical base station in the physical world, by appearing to place the virtual controllers 212 on the virtual base station 210 the user is guided to place the physical controllers on the physical base station.

In some embodiments, it may be desirable to have the virtual base station 210 and virtual controllers 212 continue to be displayed until the user has moved the physical controllers beyond some short preselected distance, for example, a few inches, away from the physical base station, and then displayed again when the user has approached to within the preselected distance. This allows for added realism in the virtual world, since the user will no longer see the virtual controllers all the time, while maintaining the convenience of seeing the virtual controllers near the virtual base station when the physical controllers are close to the physical base station. This may be particularly helpful in returning the physical controllers to the physical base station, as explained above. The preselected distance will typically be pre-programmed into the processor as part of the program which generates and outputs the instructions to the HMD to display the virtual base station and virtual controllers. Alternatively, the preselected distance may be selectable by the user in some embodiments.

The processor can continue to generate instructions to the display in the HMD to present the user with changes in the virtual world based upon actions that the user has performed with one or both of the physical controllers. In a conventional video game, for example, a user may use a controller to have a character on a television screen "pick up" a weapon displayed on the screen. Similarly, with the present approach the processor can cause a HMD to display a virtual weapon while the user is in a virtual world. Then, upon the user's extending his or her physical hand(s) in such a way as to cause the corresponding virtual hand(s) to "reach for" the displayed virtual weapon and the user's activating a proper command (e.g., by pressing a button on the controller), the processor can cause the HMD to display the user's virtual hand(s) 214 as "picking up" and holding that virtual weapon.

Figure 8:
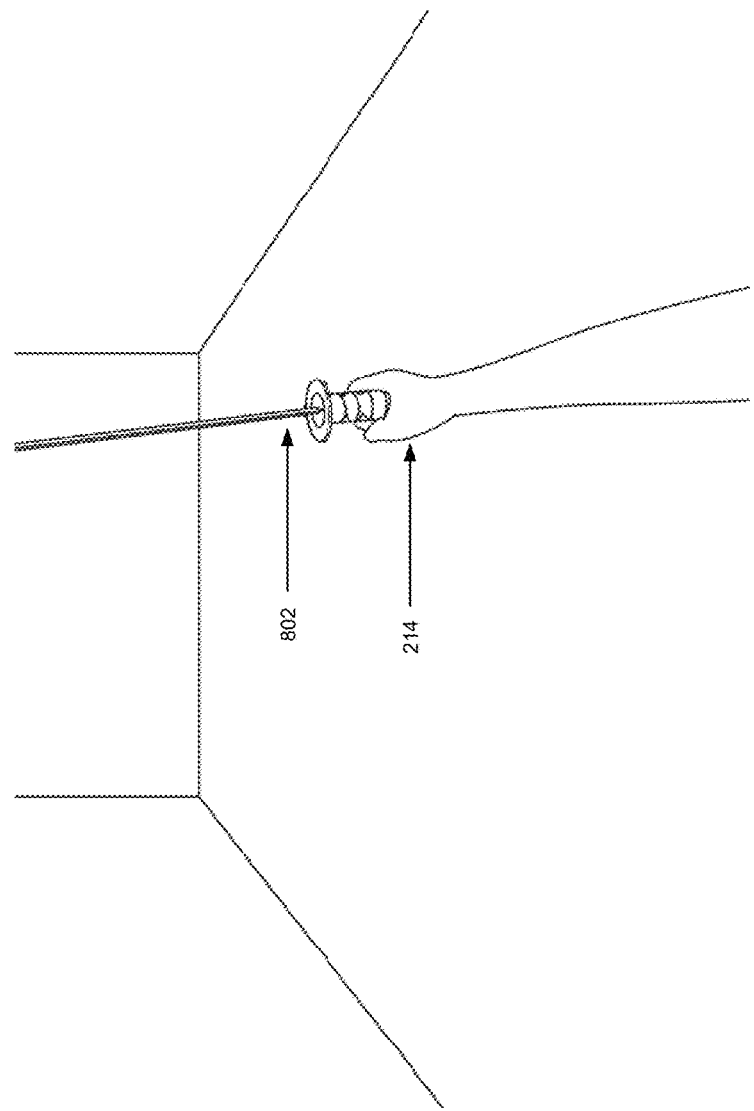
FIG. 8 is an illustration of a generated virtual world including a virtual hand holding a virtual sword as it might be seen by a user wearing a HMD after the user has activated a handheld controller in a particular situation.

FIG. 8 shows one example of what a user might see in a virtual world after the user has extended the user's physical right hand to cause the virtual right hand to extend toward a virtual sword displayed in the virtual world on the HMD, and then entered the appropriate command to pick up the virtual sword 802. The user's virtual right hand 214 is holding the virtual sword 802, although of course there is no physical sword and the user's physical right hand is instead still holding the physical controller. The processor can then display movements of the virtual sword 802 based upon movements of the user's physical right hand as determined from motion of the tracker in the physical controller.

In some embodiments, the processor can provide instructions to the HMD to make the virtual base station 210 always be displayed in the display when the user's head is turned in the direction of the physical base station. In some alternative embodiments, the processor can provide instructions to the HMD which result in the virtual base station not being displayed when the user is, for example, more than a short preselected distance away from the physical base station. (As above, the preselected distance can be pre-programmed into the processor, or may alternatively be selectable by the user.) In such cases, as above it may be desirable to allow the user to perform some action on the physical controller(s) which causes the processor to indicate where the physical base station is located, either by displaying the virtual base station 210 in the HMD display again, or possibly by providing arrows in the HMD display which indicate the direction the user should look or move to reach the physical base station.

While the above example uses two physical controllers, in some embodiments there may be only a single physical controller. In such a case, the virtual base station 210 and virtual controller 212 may no longer be displayed in the virtual world when the single physical controller has been removed from the physical base station. Other changes to the described method will be apparent to one of skill in the art.

Figure 9:
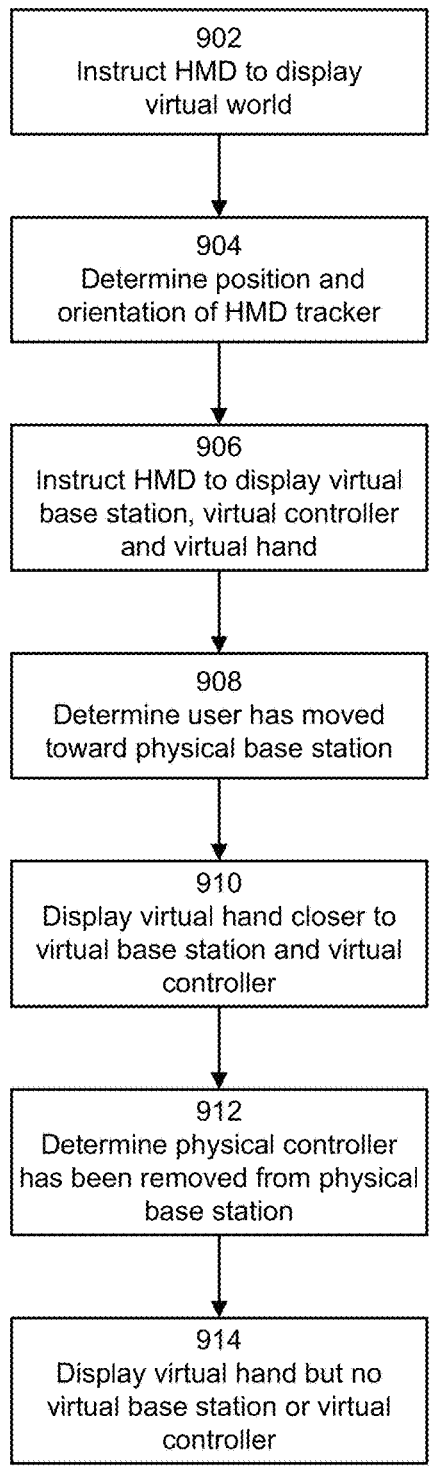
FIG. 9 is a flowchart of a method of assisting a user wearing a HMD in locating a physical handheld controller that is initially placed on a physical base station according to one embodiment.

FIG. 9 is a flowchart of a method implemented by a processor that might result in the virtual world displays shown in FIG. 2 through 7 above according to one embodiment. It is assumed that, as above, a user wears a HMD having a display, a processor provides instructions that direct what appears on the display, the HMD has a tracker used to track the position and orientation of the HMD and thus of the user's head, and there is a base station holding one or more controllers, each also having a tracker. It is also assumed that, if, for example, the electromagnetic field source or camera used to perform tracking of the HMD and controller trackers is not located in the base station, there is also a tracker in the base station so that the processor is able to determine the position and orientation of the base station, and thus track the position and orientation of the HMD and controller(s) relative to the base station.

At step 902, the processor generates and outputs instructions to the HMD to display on the HMD display a generated virtual world. At step 904, the processor determines the position and orientation of the HMD from the tracker in the HMD, and continues to do so at regular intervals.

At step 906, the processor generates and outputs instructions to the HMD to display on the HMD display a virtual base station, one or more virtual controllers placed or docked on the virtual base station, and a virtual hand or hands, such as is shown in FIG. 3. As above, at this point the virtual hand will generally be in an assumed location based upon the position and orientation of the tracker in the HMD, and is provided to help guide the user in locating the physical base station with the user's physical hand.

At step 908, the processor determines based upon the position and orientation of the tracker in the HMD (and the tracker in the base station if appropriate) that the user has moved toward the physical base station. In response, at step 910 the processor generates and outputs instructions to the HMD to display on the HMD display the virtual base station, the virtual controller still placed or docked on the virtual base station, and the virtual hand, but now with the virtual hand closer to the virtual base station, for example as shown in FIG. 4.

At step 912, the processor determines that the physical controller (or more than one of them, if there are more than one) has been removed from the physical base station, such as is shown in FIGS. 5 and 6. As above, the processor may be able to detect that an electrical connection between the physical base station and the physical controller has been broken, such as a connection that allows batteries in the physical controller to be recharged by circuitry in the physical base station. Alternatively, the physical controller may also have a tracker that allows the processor to determine the position and orientation of the physical controller, and, once the processor has determined that the distance between the physical base station and the physical controller exceeds a certain distance, the processor can therefore determine that the physical controller has been removed from the physical base station.

Finally, at step 914 the processor generates and outputs instructions to the HMD to display on the HMD display the virtual hand, but not the virtual base station or virtual controller, as shown in FIG. 6. As above, the processor can change the instructions so as to no longer display the virtual controller when the physical controller has moved more than a preselected distance from the physical base station, as determined from the position and orientation of the tracker in the physical controller.

It will be apparent to one of skill in the art that some of these steps may be performed in a different order than specified, while others should be performed in order to obtain the desired effect. For example, the processor may determine the position and orientation of the HMD tracker before generating and outputting the instructions to the HMD to display the generated virtual world. On the other hand, it will most likely not be appropriate to send the instructions that result in the HMD no longer displaying the virtual controller before the user has removed the physical controller from the physical base station.

As above, the physical controller has a tracker, so the virtual hand may now be in an apparent location corresponding to the actual location of the user's physical hand rather than in an assumed location, since the processor will know where the user's physical hand is from the tracker in the physical controller. The ability of the user to see virtual hands in the locations corresponding to the user's physical hands can help the user to believe in the reality of the virtual world, as well as help in picking up the physical controllers as described above. As explained elsewhere herein, this can also help the user to operate in a selected area, thereby avoiding physical obstacles in the real world.

In this way, the display of the virtual base station, virtual controller(s) and virtual hand(s) allows the user to locate and pick up the physical controller(s) primarily by sight rather than by touch, even though the user is already wearing the HMD and seeing only the virtual world, and is thus unable to see the physical controller(s). Reversing the process as explained above similarly allows the user to return the physical controller(s) to the base station when the user is ready to exit the virtual world, or for other reasons, without having to remove the HMD first.

As above, another issue that may arise when the user is in the virtual world is that the user may not be able to see the surrounding physical environment and therefore may not be aware of how far the user has moved in the physical world, and may collide with physical obstacles while trying to accomplish tasks in the virtual world. For example, if a user is physically located in the user's living room and playing a game within a virtual world, there will likely be physical objects or obstacles present in the room such as a sofa or other furniture, lamps, and even the walls of the room. Since the display in the HMD blocks the user's view of the physical world, the physical objects are not visible to the user. Further, since it is generally considered preferable to present the user with a view of only the virtual world in order to get the desired immersive effect, these physical items are similarly not presented to the user through the HMD display (other than the virtual base station 210 and virtual controllers 212 for the purposes explained above). However, if the user cannot tell where the user is, or where these physical objects are, while the user in the virtual world, there is a risk that the user's motions may cause him or her to collide with these objects, possible resulting in damage to the objects or even injury to the user.

Thus, it is desirable to provide a means by which the user may be made aware that the user is approaching a boundary of a selected area in which the user desires to remain, to avoid physical objects or for any other reason, without distracting the user from the immersive virtual world. In one embodiment, a selected area having an outer boundary is determined, such as a "safe" area in which the user can move freely without coming into contact with the physical objects in the user's vicinity. The selected area may already be clear of physical obstacles, or the user or other person may move physical objects to clear the selected area. (Some objects, such as rugs, may not need to be moved.) The processor provides instructions to the HMD display to include a display of a virtual fence at the boundary when the user comes within a preselected distance of the boundary of the selected area, thus providing a warning that the user is approaching the boundary of the selected area.

Figure 10:
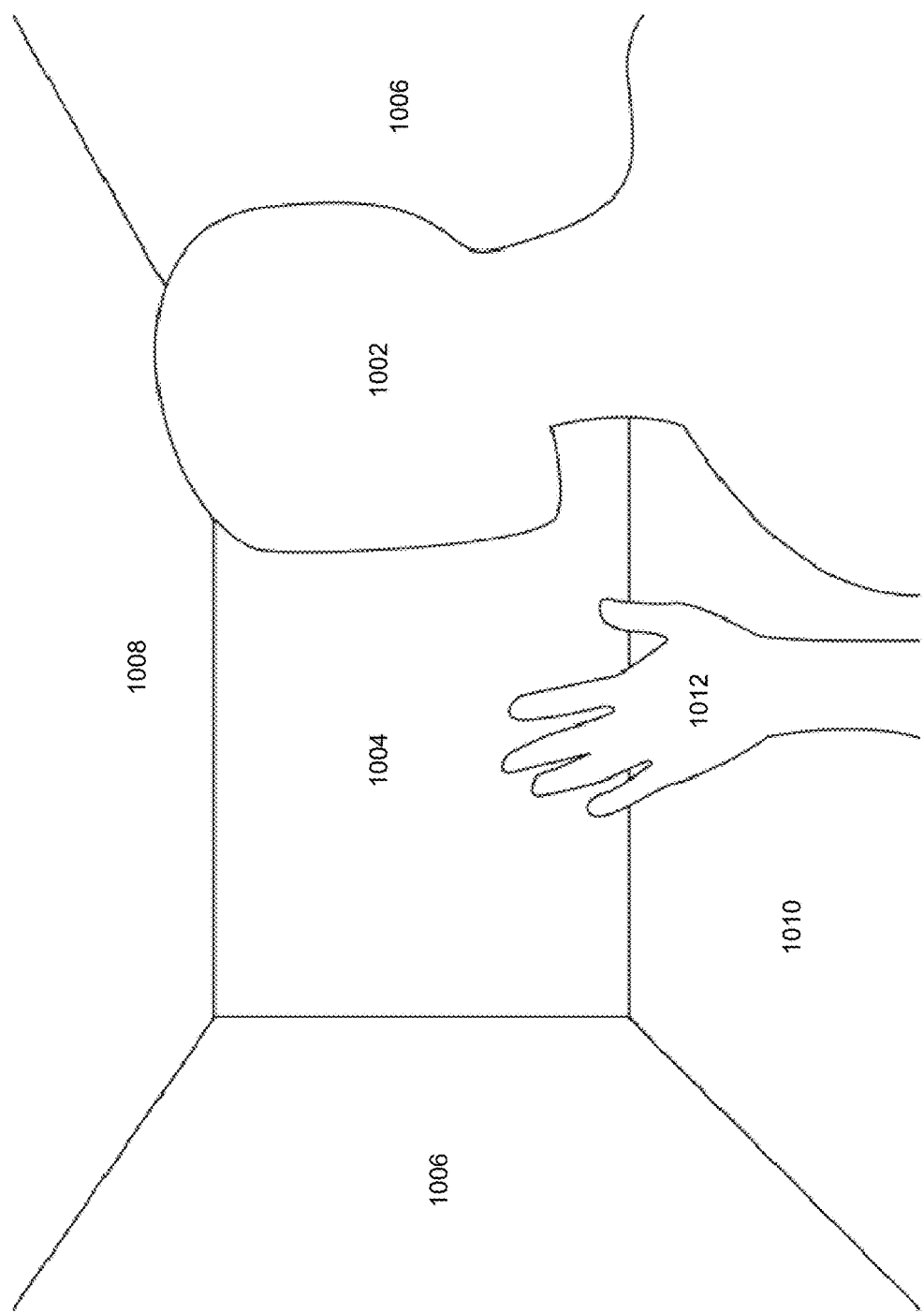
FIG. 10 is an illustration of a user and a virtual hand in a virtual world as the virtual hand might be seen by a user wearing a HMD.

FIG. 10 shows a representation of a user 1002 in a virtual space. (As the display is usually presented from the user's point of view, the user 1002 does not see himself or herself, but is shown here for illustrative purposes only.) As above, the processor instructs the HMD display to show the user a virtual world, as illustrated here a room including a back wall 1004, side walls 1006, ceiling 1008 and floor 1010. Also as above, the user will see his or her virtual hand 1012; again, virtual hand 1012 will be in the location of the user's actual hand if the user 1002 is holding a controller having a tracker that provides position and orientation information to the processor, and in an assumed location if the user 1002 is not holding such a controller. As above, since the user is wearing a HMD that displays the virtual world, the physical world and any physical objects are not visible to the user.

As above the processor is tracking the position and orientation of the user's head from the tracker of the HMD, and possibly tracking the position and orientation of the user's hand if the user is holding a controller with a tracker. Thus, the processor knows where the user's head and hands are located; if the processor has been provided with information about the boundary of the selected area then the processor can also determine when the user's head and/or hand approaches the boundary.

In one embodiment, when the user's head and/or hand approaches to within a preselected distance, for example, one foot (again, either preprogrammed into the processor or user selectable), of the boundary of the selected area the processor generates a warning that the user is close to the boundary so that the user can take action to avoid the boundary and thus potential collision with the physical objects. In some embodiments, the processor can generate this warning by generating instructions to the HMD display to add some virtual element to the virtual world which can be seen by the user.

Figure 11:
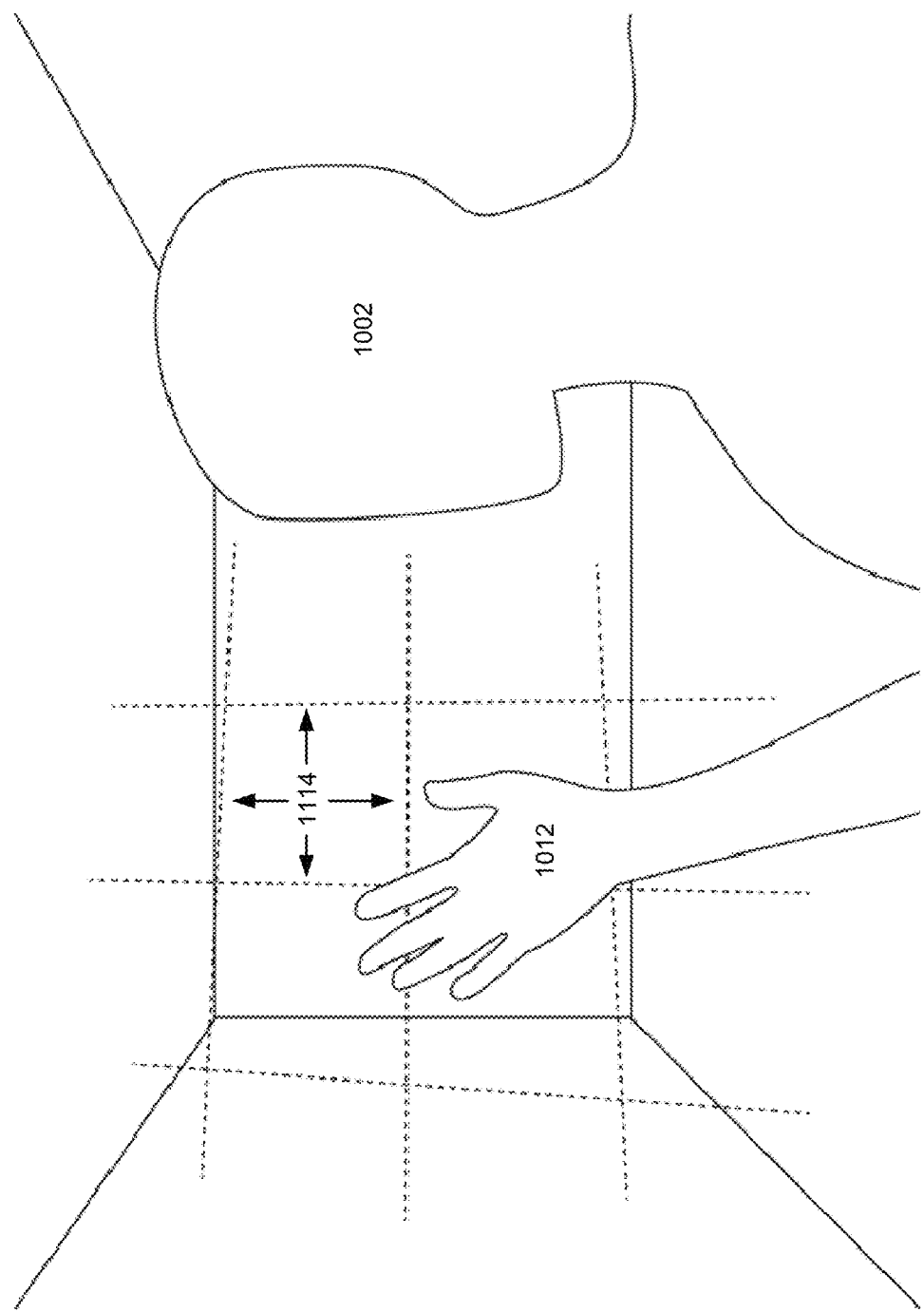
FIG. 11 another illustration of a user, a virtual hand and a visual warning in a virtual world as virtual hand and visual warning might be seen by a user wearing a HMD the user approaches a boundary defining a selected area in the physical world.

FIG. 11 shows one such form of visual warning. In FIG. 11 it is assumed that the user 1002 is holding a controller with a tracker in the hand corresponding to virtual hand 1012, and that the user 1002 has extended that hand to a point within the preselected distance from the boundary of the selected area. The display in FIG. 11 is similar to that of FIG. 10, except that since the user 1002 has extended his hand holding the controller, the virtual hand 1012 now extends further in front of the user 1002.

In addition, since the hand of the user 1002 is within the preselected distance of the boundary of the selected area, the processor generates instructions to the HMD to generate the visual warning. As illustrated in this embodiment, this visual warning is in the form of a grid of lines or a "virtual fence" located at the boundary, as indicated in FIG. 11 by the dashed lines 1114. The grid can be glowing or colored if desired to be more visible to the user. In other embodiments, other shapes than a grid-shaped virtual fence can be displayed to the user. For example, the developer of a particular application may choose some other design to provide contrast with, or maintain thematic correctness with, the particular virtual world being displayed. In some embodiments, even a uniform translucent glow of a particular color, such as red, may be appropriate to serve as the visual warning. In addition, the brightness of the visual warning may increase as the distance the user is from the boundary decreases to provide further notice that the user is getting still closer to the boundary.

The virtual fence 1114 need not cover the entire display of the HMD; it is believed that it will generally be sufficient for the processor to generate instructions to have the HMD display show the virtual fence 1114 in an area around the point in the virtual world at which the user's head or hand has approached the boundary of the selected area. To minimize rendering cost, the fence may be rendered as a projected texture on small pieces of 3D geometry that cover only the areas where the fence is to be visible. A cylindrical projection is calculated by converting the position of the 3D geometry into cylindrical coordinates, which are used to offset a texture map. This gives the impression that the grid lines of the fence are stationary as the 3D geometry is moved to follow the tracker while it is in the proximity of the boundary, minimizing screen coverage of the geometry for optimal processor performance. Blending is used to create a smooth fade transition on the edges of the geometry, and to make it more transparent as the tracking device moves away from the boundary. When the tracker is beyond the preselected distance, the grid becomes completely transparent and the 3D geometry is removed completely to save processing time.

In addition, a different type of visual warning may be appropriate when the user is not looking in the direction in which he or she is approaching the boundary of the selected area. For example, if a user is approaching the boundary of the selected area but not looking in the direction of the boundary, if the HMD display is instructed to provide only a view of the virtual world in front of the user there may be no visual warning. Thus, in these cases, some other type of visual warning, perhaps with directional arrows indicating the direction of the boundary in relation to the user's view, may be appropriate. It is also possible to include auditory warnings instead of, or in addition to, a visual warning.

As above, the fence is displayed in the vicinity of the user's head or hands when the user's head or hands are approaching the boundary as determined by the trackers on the user's head or hands. This may require an earlier warning when it is the user's head that approaches the boundary, since this likely means that the user's body is close to the boundary, and thus that the user's hands may easily go beyond the boundary as a result of an intentional motion or even a reflexive motion. Thus, the preselected distance within which an approach by the user causes the processor to display the visual warning may be defined separately for the HMD tracker and the handheld controller tracker(s). In addition, the preselected distance may vary by application, so that, for example, it is greater in an application in which larger body movements are expected from the user than in an application in which such body movements are not expected.

If the user's head or hands go beyond the boundary as determined by the trackers, the processor can provide additional messaging or warning, such as text or auditory warnings, or an additional visual warning, that persists until the user returns to the selected area within the boundary. In addition, if the user's head goes beyond the boundary, the processor can cause the HMD to fade to black, and present, for example, only a warning message and/or a beacon or arrows directing the user to move in the direction of the boundary and the selected area.

Figure 12:
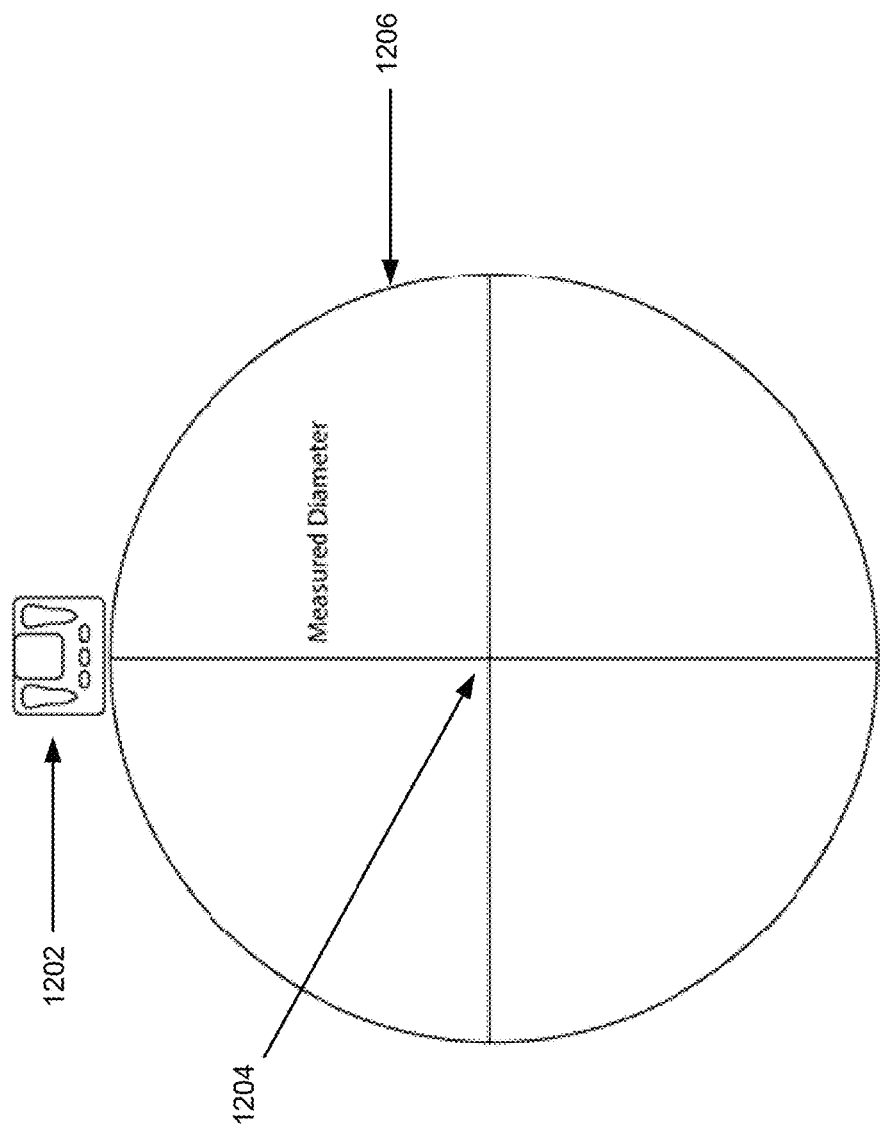
FIG. 12 is an illustration of a selected area in one embodiment.

The boundary of the selected area may be determined in several ways. In some embodiments, a person, such as the user or another person, for example the parent of a child user, may input information into the processor indicating that there is a circular area in front of the base station and having a measured diameter that is clear of objects. FIG. 12 illustrates this configuration.

In one embodiment, the information input to the processor is determined by activating one of the trackers, either in the HMD or a handheld controller, at a position 1204 directly in front of a base station 1202. From the position 1204 of the tracker (and the position of a base station tracker if, for example, the electromagnetic field source or camera are not in the base station), the processor can determine how far away the tracker is from the base station 1202, and then determine a circular area 1206 having a radius of that distance centered at that point 1204. In this case, the user should check to see that there are no obstacles within that defined circle since the processor has no way to determine whether there are any such obstacles in the circular area 1206.

In another embodiment, the radius (or diameter) of the circular area 1206 is measured (for example, by the user), and the processor receives as input the measurement. The processor may also receive the fact that the circular area is directly in front of the physical base station 1204 (again using information from a base station tracker if appropriate), or alternatively the user may be told to set up the physical base station 1204 and circular area 1206 in this fashion. In some embodiments, such instructions to the user could even include the radius (or diameter) of a preprogrammed circular area, and direct the user to clear an area of such size of any obstacles.

Figure 13:
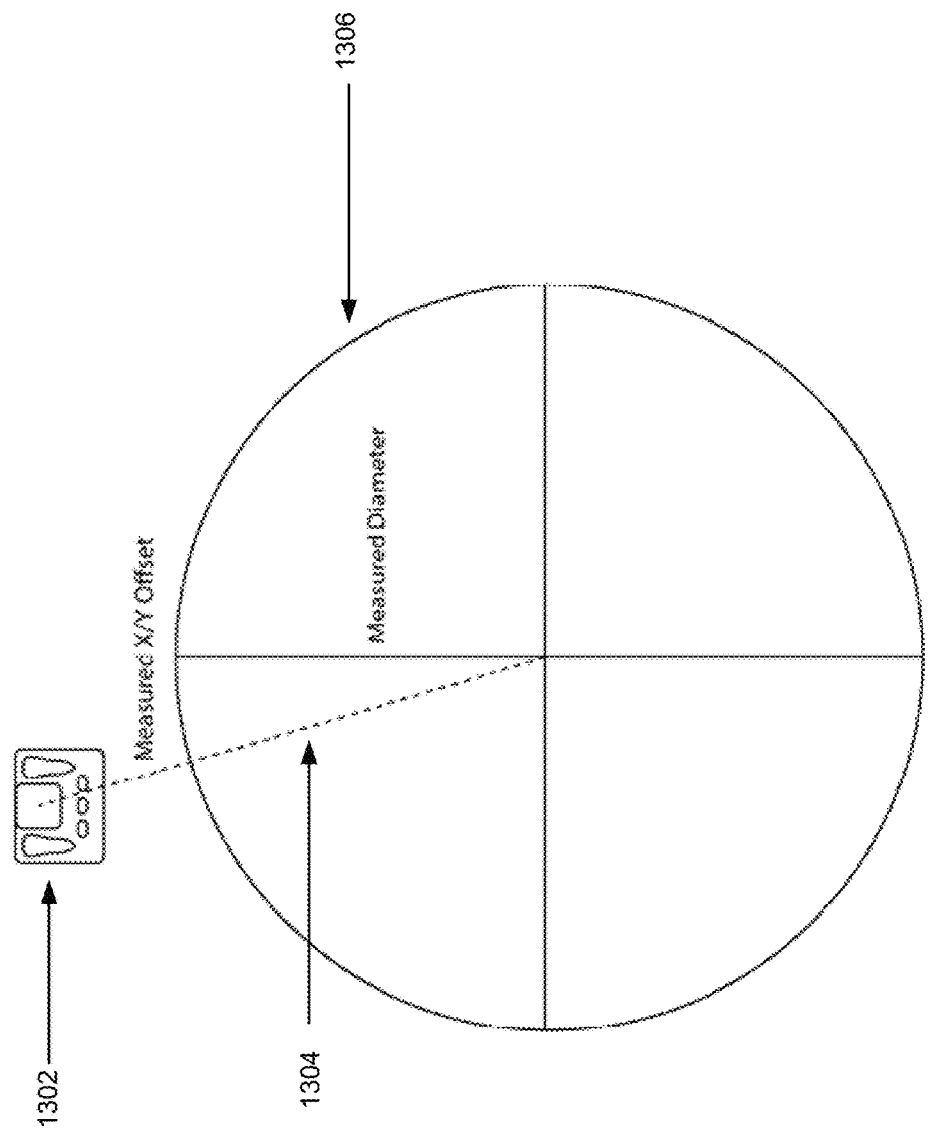
FIG. 13 is an illustration of a selected area in another embodiment.

In some cases, due to the layout of a particular space, or the objects in the space, it may not be convenient or desirable to locate a desired circular selected area immediately in front of the base station as in FIG. 12. Thus, as shown in FIG. 13, in one alternative embodiment, the radius (or diameter) of an open circular area 1306 is measured, e.g., by the user, and that measurement is received by the processor as input. A tracker is placed at the center of the circular area, and by determining the tracker's position and orientation the processor is able to determine the offset distance and direction to the center of the circular area from either the base station or another location having the electromagnetic field source, camera or other tracking components. This allows the processor to define the circular area having the measured radius, and centered at the measured offset position, as a selected area.

Figure 14:
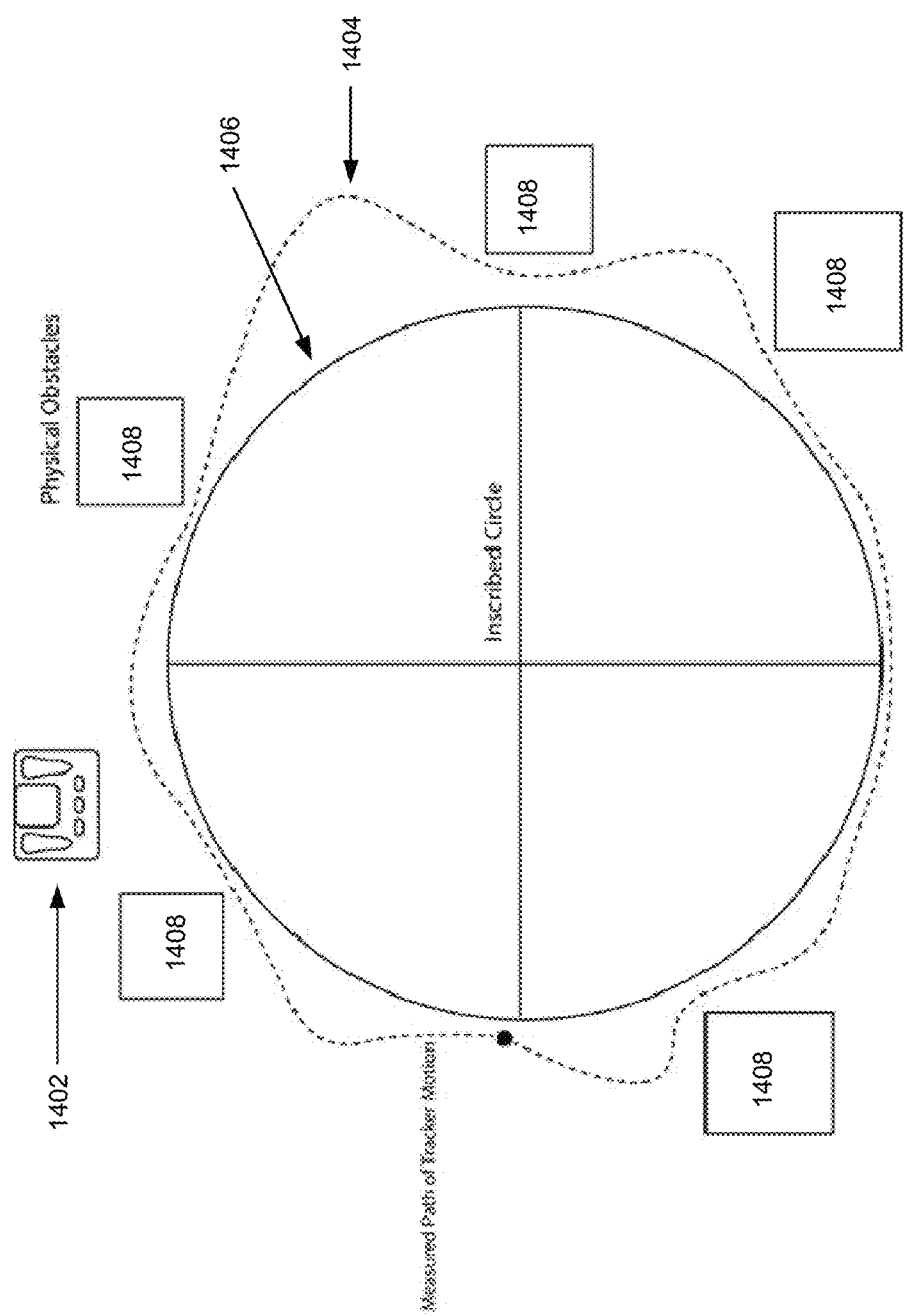
FIG. 14 is an illustration of a selected area in still another embodiment.

In still another embodiment, an irregularly shaped area is defined, as shown in FIG. 14. A boundary 1404 around an irregularly shaped area, which is not circular, can be defined, for example, by having the user walk around a perimeter chosen by the user with one of the trackers to define the outer boundary of a selected area, for example, one in which there are no obstacles. The processor determines the position of the tracker at a number of sampling points as the user moves around the chosen perimeter, and from those points determines the boundary 1404. This approach may be desirable when the size of a circle 1406 that can be inscribed within boundary 1404 is limited by nearby objects 1408, but there is some additional room between objects 1408 in which the user can be free to move without risk of collision with objects 1408.

Figure 15:
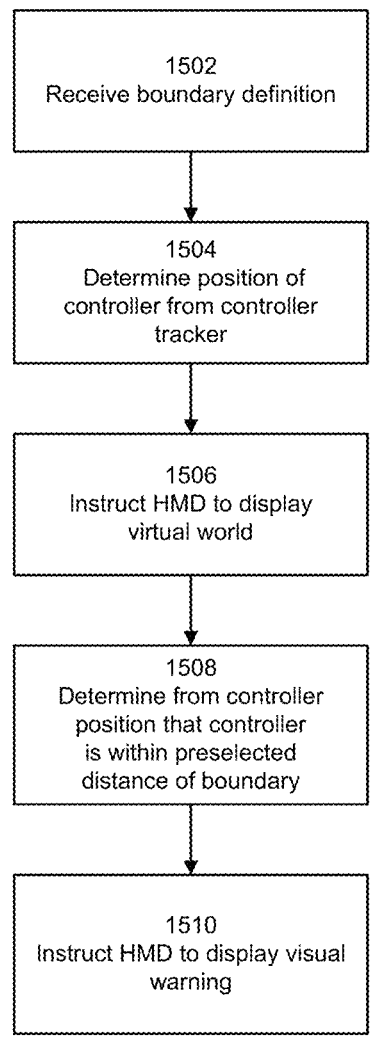
FIG. 15 is a flowchart of a method of assisting a user wearing a HMD in remaining in a selected area according to one embodiment.

FIG. 15 is a flowchart of a method implemented by a processor that might result in the display of a visual warning such as the virtual fence 1114 of FIG. 11, or other warnings as described above. As in the method of locating objects described above, it is assumed that a user wears a HMD having a display, a processor provides instructions that direct what appears on the display, and the user is holding a handheld controller having a tracker which can be used to track the position and orientation of the handheld controller.

At step 1502, the processor receives as an input information from which the processor can define a boundary surrounding a selected area, for example, one in which there are no physical obstacles. As above, this information will typically be entered by a user or someone else, or may in part or whole be received from a tracker, and may be the radius and location of the center of a circle of a determined diameter that is clear of obstacles, or positions around an irregularly shaped area provided by the user or other person walking around the boundary holding a tracker. Alternatively, as above, the user may be told to clear any obstacles from a circular area of a preprogrammed radius or diameter.

At step 1504, the processor determines the position of the handheld controller from the controller tracker. Next, at step 1506, the processor generates and outputs instructions to the HMD to display on the HMD display a generated virtual world.

Next, at step 1508, the processor determines from the position of the handheld controller that the handheld controller is within a preselected distance of the boundary. Finally, at step 1510 the processor generates and outputs instructions to the HMD to display on the HMD a visual warning to the user. As above, this visual warning can be in the form of grid lines such as a virtual fence, or some other configuration. In appropriate situations an audible warning can be generated in addition to, or in lieu of, the visual warning.

As with the method of assisting a user in locating a physical controller above, a person of skill in the art will appreciate that some of the steps of the method of assisting a user in avoiding physical objects may be performed in a different order, while certain steps will be most advantageously performed in a particular order.

Also as above, the user is wearing a HMD that may also have a tracker. In such a case, the processor may also display a visual warning when the user's head approaches the boundary. Since the user does not see his or her own head in the virtual world, the visual warning in this case may, for example, again be in the form of grid lines, and appear in the virtual world to be immediately in front of the user.

Also as above, in various embodiments, the processor can generate the visual warning in the form of grid lines or a virtual fence, or in any other desired shape or configuration. In some embodiments, it may again be appropriate to generate an audio warning as well, or instead of, the visual warning.

By alerting a user in this fashion that the user is approaching the boundary of the selected area, the described system and method allows a user to take action to avoid the boundary and stay within the selected area defined by that boundary. This can assist the user in avoiding collision with physical objects in the area of the user, and any possible resulting damage to such objects or injury to the user.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result of performance of all of the described steps.

For example, it is expected that the described apparatus may be implemented in numerous ways. As noted above, the controller(s) may nest or dock in a base station, or may be separate handheld controllers familiar to users of video game consoles. As above, various embodiments may be applicable to HMDs that block the user's view of all or only part of the physical world. Even some uses of a device such as Google Glass, which obscures only a small portion of the user's field of vision of the physical world, may benefit from some embodiments described herein.

There may be a single processor, or multiple processors performing different functions of the functions described herein. As above, a processor may be located in the base station, or in a separate location, or even in the HMD or one of the controllers if desired. One of skill in the art will appreciate how to determine which and how many processors will be appropriate for a specific intended application. Similarly, as explained above, various tracking techniques may be used in addition to electromagnetic tracking, and in some embodiments some of the other components used for tracking, such as an electromagnetic field source or a camera, may be located in the base station, while in other embodiments they may be located elsewhere.

One of skill in the art will also appreciate that controllers may be of various shapes other than those shown or described herein. It may be desirable to have a controller in the shape of an object that is intended to appear in the virtual world so that the user's hands "feel" the same object that is seen in the HMD; for example, a controller may take the shape of a bat, tennis racket, golf club or other sporting implement (or the handle of such an object), a gun, sword or other weapon (or again the handle thereof), or some other toy or device which will appear in the virtual world.

These and other variations upon the embodiments are intended to be covered by the present disclosure, which is limited only by the appended claims.

What is claimed is:

1. A method of assisting a user wearing a head-mounted display (HMD) in remaining within a selected area of the physical world, the user holding a handheld controller having a controller tracker which provides information regarding a position of the handheld controller, the method comprising:

determining, by a processor, a definition of a boundary of the selected area by:

determining in sequence, by the processor, the location of the handheld controller, in the physical world and relative to a tracker located on the user's body, at each of a plurality of points using information from the controller tracker; and connecting in sequence, by the processor, the plurality of determined locations to form the boundary;

determining, by the processor, the position of the handheld controller in the physical world using information from the controller tracker;

generating and outputting, by the processor, instructions to the HMD to display on the HMD a virtual world;

determining, by the processor, from the position of the handheld controller that the handheld controller is within a first preselected distance from the boundary;

generating and outputting, by the processor, instructions to the HMD to display on the HMD a first visual warning in the virtual world.

2. The method of claim 1 wherein:

generating and outputting instructions to the HMD to display the virtual world further comprises generating and outputting instructions to the HMD to display on the HMD a virtual hand in the virtual world, the virtual hand having an apparent location in the virtual world that corresponds to the position of the handheld controller in the physical world; and the first visual warning is a pattern of grid lines in the vicinity of the displayed virtual hand.

3. The method of claim 1, wherein the HMD has a HMD tracker which provides information regarding the position and orientation of the HMD, the method further comprising:

determining, by the processor, the position of the HMD in the physical world using information from the HMD tracker;

determining, by the processor, from the position of the HMD that the HMD is within a second preselected distance of the boundary;

generating and outputting, by the processor, instructions to the HMD to display on the HMD a second visual warning in the virtual world.

4. The method of claim 3 wherein the second visual warning is a pattern of grid lines having an apparent location in the virtual world immediately in front of the user.

5. The method of claim 3 wherein the first visual warning and the second visual warning are the same.

6. The method of claim 3 wherein the first visual warning and the second visual warning are different.

7. The method of claim 3 wherein the first preselected distance and the second preselected distance are the same distance.

8. The method of claim 3 wherein the first preselected distance and the second preselected distance are different distances.

9. A method of assisting a user wearing a head-mounted display (HMD) in remaining within a selected area of the physical world, the user holding a handheld controller having a controller tracker which provides information regarding a position of the handheld controller, the method comprising:

determining, by a processor, a definition of a boundary of the selected area by:
  determining, by the processor, a location of the handheld controller in the physical world using information from the controller tracker, the determined position being relative to a tracker located on the user's body;
  receiving, by the processor, a distance measurement; and
  defining, by the processor, the boundary as having a circular shape, centered at the determined location and having a radius equal to the received distance measurement;

generating and outputting, by the processor, instructions to the HMD to display on the HMD a virtual world;

determining, by the processor, from the position of the handheld controller that the handheld controller is within a first preselected distance from the boundary;

generating and outputting, by the processor, instructions to the HMD to display on the HMD a first visual warning in the virtual world.

10. A system to assist a user in remaining in a selected area of the physical world, the user wearing a head-mounted display (HMD) and holding a handheld controller, comprising:

a controller tracker on the handheld controller which provides information regarding a position of the handheld controller; and a processor configured to:
  determine a definition of a boundary of the selected area by
    determining in sequence the location of the handheld controller, in the physical world and relative to a tracker located on the user's body, at each of a plurality of points using information from the controller tracker, and
    connecting in sequence the plurality of determined locations to form the boundary;
  determine the position of the handheld controller in the physical world using information from the controller tracker;
  generate and output instructions to the HMD to display on the HMD a virtual world;
  determine from the position of the handheld controller that the handheld controller is within a first preselected distance from the boundary; and
  generate and output instructions to the HMD to display on the HMD a first visual warning in the virtual world.

11. The system of claim 10 wherein the processor is further configured to generate and output instructions to the HMD to display on the HMD a virtual hand in the virtual world, the virtual hand having an apparent location in the virtual world that corresponds to the position of the handheld controller in the physical world; and wherein the first visual warning is a pattern of grid lines in the vicinity of the displayed virtual hand.

12. The system of claim 10 further comprising a HMD tracker on the HMD which provides information regarding the position and orientation of the HMD, and wherein the processor is further configured to:

determine the position of the HMD in the physical world using information from the HMD tracker;

determine from the position of the HMD that the HMD is within a second preselected distance of the boundary;

generate and output instructions to the HMD to display on the HMD the visual warning.

13. The system of claim 12 wherein the second visual warning is a pattern of grid lines having an apparent location in the virtual world immediately in front of the user.

14. The system of claim 12 wherein the first visual warning and the second visual warning are the same.

15. The system of claim 12 wherein the first visual warning and the second visual warning are different.

16. The system of claim 12 wherein the first preselected distance and the second preselected distance are the same distance.

17. The system of claim 12 wherein the first preselected distance and the second preselected distance are different distances.

18. A system to assist a user in remaining in a selected area of the physical world, the user wearing a head-mounted display (HMD) and holding a handheld controller, the system comprising:

a controller tracker on the handheld controller which provides information regarding a position of the handheld controller; and a processor configured to determine a definition of a boundary of the selected area by:

determining in sequence the location of the handheld controller in the physical world at each of a plurality of points using information from the controller tracker, the determined position being relative to a tracker located on the user's body; and connecting in sequence the plurality of determined locations to form the boundary;

determine a location of the handheld controller in the physical world using information from the controller tracker;

receive a distance measurement; and define the boundary as having a circular shape, centered at the determined location and having a radius equal to the received distance measurement.

19. A non-transitory computer-readable medium having embodied thereon a program, the program being executable by a processor to perform a method of assisting a user wearing a head-mounted display (HMD) in remaining within a selected area of the physical world, the user holding a handheld controller having a controller tracker which provides information regarding a position and orientation of the controller, the method comprising the steps of:

determining, by a processor, a definition of a boundary of the selected area by:

determining in sequence, by the processor, the location of the handheld controller, in the physical world and relative to a tracker located on the user's body, at each of a plurality of points using information from the controller tracker; and connecting in sequence, by the processor, the plurality of determined locations to form the boundary;

determining, by the processor, the position of the handheld controller in the physical world using information from the controller tracker;

generating and outputting, by the processor, instructions to the HMD to display on the HMD a virtual world;

determining, by the processor, from the position of the handheld controller that the handheld controller is within a first preselected distance from the boundary;

generating and outputting, by the processor, instructions to the HMD to display on the HMD a first visual warning in the virtual world.

\* \* \* \* \*